(12) United States Patent
Seo

(10) Patent No.: US 8,929,266 B2
(45) Date of Patent: Jan. 6, 2015

(54) METHOD AND APPARATUS FOR CONTROLLING SLEEP MODE AT MOBILE STATION IN A PACKET-BASED COMMUNICATION SYSTEM

(75) Inventor: Han-Shin Seo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 386 days.

(21) Appl. No.: 13/016,210

(22) Filed: Jan. 28, 2011

(65) Prior Publication Data

US 2011/0188394 A1 Aug. 4, 2011

(30) Foreign Application Priority Data

Jan. 29, 2010 (KR) .................. 10-2010-0008794

(51) Int. Cl.
*G08C 17/00* (2006.01)
*H04B 7/185* (2006.01)
*H04W 52/02* (2009.01)
*H04L 12/26* (2006.01)

(52) U.S. Cl.
CPC ............... *H04L 12/26* (2013.01); *H04W 52/02* (2013.01)
USPC .......................................... 370/311; 370/318

(58) Field of Classification Search
None
See application file for complete search history.

(56) References Cited

U.S. PATENT DOCUMENTS

| | | | |
|---|---|---|---|
| 2003/0117968 A1* | 6/2003 | Motegi et al. ................. | 370/311 |
| 2004/0082312 A1* | 4/2004 | O'Neill et al. ................ | 455/405 |
| 2005/0074015 A1* | 4/2005 | Chari et al. .................... | 370/400 |
| 2005/0076113 A1* | 4/2005 | Klotz et al. .................... | 709/224 |
| 2005/0201391 A1* | 9/2005 | Ma et al. ........................ | 370/401 |
| 2006/0036733 A1* | 2/2006 | Fujimoto et al. .............. | 709/225 |
| 2006/0047791 A1* | 3/2006 | Bahl .............................. | 709/220 |
| 2013/0128794 A1* | 5/2013 | Ananthanarayanan et al. ............................. | 370/311 |

* cited by examiner

*Primary Examiner* — Jutai Kao

(57) ABSTRACT

A method and an apparatus dynamically controls a sleep mode in an MS in a packet-based communication system. A packet analyzer analyzes a type of a packet that the MS transmits or receives. A controller sets a timer to a timer value according to the analyzed type of the packet.

20 Claims, 4 Drawing Sheets

METHOD AND APPARATUS FOR CONTROLLING SLEEP MODE AT MOBILE STATION IN A PACKET-BASED COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 29, 2010 and assigned Serial No. 10-2010-0008794, the contents of which are incorporated herein by reference.

TECHNICAL FIELD OF THE INVENTION

The present invention relates generally to a method and apparatus for performing a sleep mode at a Mobile Station (MS) in a communication system, and more particularly, to a method and apparatus for controlling a sleep mode at an MS by using a variable timer in a packet-based communication system.

BACKGROUND OF THE INVENTION

In a packet-based wireless communication system, if an MS has not transmitted or received packets for a predetermined time, it enters a power saving mode, i.e. a sleep mode, to minimize its power consumption.

The MS generally uses a timer to determine the time to enter the sleep mode. In the absence of packet transmission and reception for a predetermined time period measured from a reference time, the MS requests transition to the sleep mode to a Base Station (BS). Upon receipt of a response to the transition-to-sleep mode request from the BS, the MS enters the sleep mode.

FIG. 1 illustrates a signal flow for entering a sleep mode using a timer at an MS in a conventional packet-based communication system.

Referring to FIG. 1, an MS 101 monitors whether packets have been transmitted or received during a time period measured from time $T_1$, indicated by a dotted line, after a timer that includes a predetermined value starts at time $T_1$. The MS 101 receives a downlink packet from a BS 103 at time $T_2$. Thus the timer that has started at time $T_1$ is terminated and is reset at time $T_2$. The MS 101 then monitors packet transmission and reception during the predetermined timer period starting at time $T_2$. Because an uplink packet is generated at time $T_3$, the timer that has started at time $T_2$ is terminated and is reset at time $T_3$. There is neither packet transmission nor packet reception during the predetermined timer period from time $T_3$. Therefore, the MS 101 requests transition to the sleep mode to the BS 103. Upon receipt of a response from the BS 103, the MS 101 enters the sleep mode. The timer value is normally fixed.

However, packets of some types transmitted from an MS always require responses. For example, such packet types are Transmission Control Protocol (TCP) packets or Dynamic Host Configuration Protocol (DHCP) packets. If the MS operates a timer that includes a fixed timer value to receive a response for such a packet, it may fail to receive the response, thus losing the response packet.

For example, when the timer value is fixed to 30 seconds and a response to a TCP packet transmitted by the MS reaches the MS 40 minutes later, the MS has already entered the sleep mode and thus does not receive the response.

With regard to a DHCP packet, the MS should transmit a DHCP Request packet to a BS in order to get an Internet Protocol (IP) address, receive a DHCP packet in response to the DHCP Request packet from the BS, and check whether the received DHCP packet includes an Acknowledgement (ACK) in a DHCP procedure. However, if the MS uses a timer set to a fixed timer value, the timer expires before the MS receives an ACK for the transmitted DHCP Request packet. Thus the MS may enter the sleep mode. Even though the MS retransmits the DHCP Request packet to the BS, the DHCP Request packet may not be processed normally.

Alternatively, in a service using packets that are generated more often than the fixed timer value (e.g. a text message service), the MS is highly probable to receive a response packet before timeout, which makes power saving difficult.

As described above, the conventional technology that uses a fixed timer value does not take into account characteristics of packets that an MS transmits or receives. The MS may fail to transmit or receive packets successfully, or the MS may not enter the sleep mode. As a consequence, the power consumption of the MS may be increased.

SUMMARY OF THE INVENTION

To address the above-discussed deficiencies of the prior art, it is a primary object to provide a method and apparatus for controlling a sleep mode at an MS in a packet-based communication system.

Another aspect of embodiments of the present invention provides a method and apparatus for changing a sleep-mode timer value according to the type of a packet that an MS transmits or receives in a packet-based communication system.

Another aspect of the embodiments of the present invention provides a method and apparatus for setting a different timer value according to whether an MS transmits or receives a TCP packet or a DHCP packet in a packet-based communication system.

In accordance with an embodiment of the present invention, there is provided a method for controlling a sleep mode in an MS in a packet-based communication system. A type of a packet that the MS transmits or receives is analyzed. And a timer is set to a timer value according to the analyzed type of the packet.

If the packet type is a Dynamic Host Configuration Protocol (DHCP) Request packet, the timer is set to an infinite value. Upon receipt of an Acknowledgement (ACK) response to the DHCP Request packet from a BS, the timer is reset to zero ('0').

If the packet type is a Transmission Control Protocol (TCP) packet, the timer is set to a maximum of response waiting time set for ports that have generated TCP packets. Upon receipt of an ACK packet or Reset packet in response to the TCP packet before expiration of the timer set to the infinite value, a port that has generated the TCP packet is removed. If there are remaining ports waiting for responses, except for the removed port, the timer is reset to a maximum of response waiting times of the remaining ports. In the absence of a remaining port waiting for a response, except for the removed port, the timer is reset to zero ('0').

In accordance with another embodiment of the present invention, there is provided an apparatus for controlling a sleep mode at an MS in a packet-based communication system. A packet analyzer analyzes a type of a packet that the MS transmits or receives. A controller sets a sleep-mode timer to a timer value according to the analyzed type of the packet. And the sleep-mode timer operates according to the timer value.

If the packet type is a DHCP Request packet, the controller sets the sleep-mode timer to an infinite value. Upon receipt of an ACK response to the DHCP Request packet from a BS, the controller resets the sleep-mode timer to zero ('0').

If the packet type is a TCP packet, the controller sets the sleep-mode timer to a maximum of response waiting time set for ports that have generated TCP packets. Upon receipt of an ACK packet or Reset packet in response to the TCP packet before expiration of the timer set to the infinite value, the controller removes a port that has generated the TCP packet. If there are remaining ports waiting for responses, except for the removed port, the controller resets the sleep-mode timer to a maximum of response waiting times of the remaining ports. In the absence of a remaining port waiting for a response, except for the removed port, the controller resets the sleep-mode timer to zero ('0').

In accordance with yet another embodiment of the present invention, there is provided an apparatus for controlling a sleep mode at an MS in a packet-based communication system. The method includes analyzing at least one of a transmission packet and a received packet to determine a packet type. Based on the analyzed packet type, a timer is set to a timer value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Figure 1:
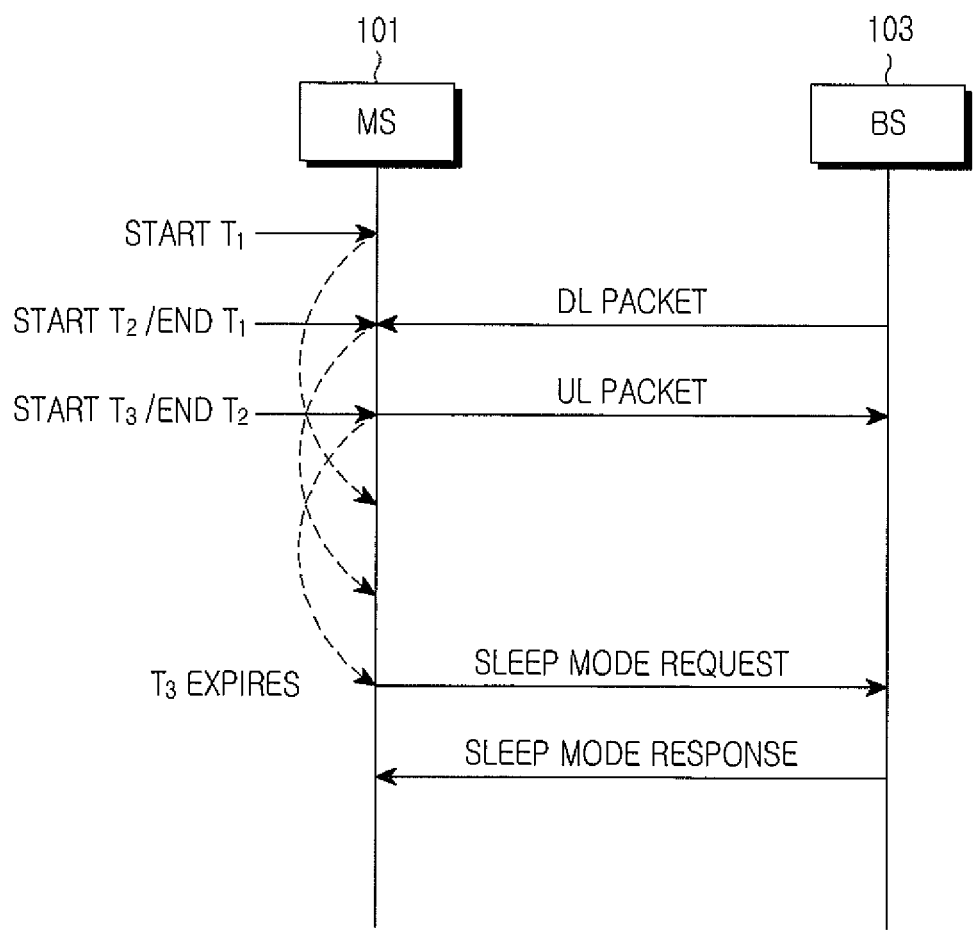
FIG. 1 illustrates a signal flow for entering a sleep mode using a timer by an MS in a conventional packet-based communication system.
Figure 2:
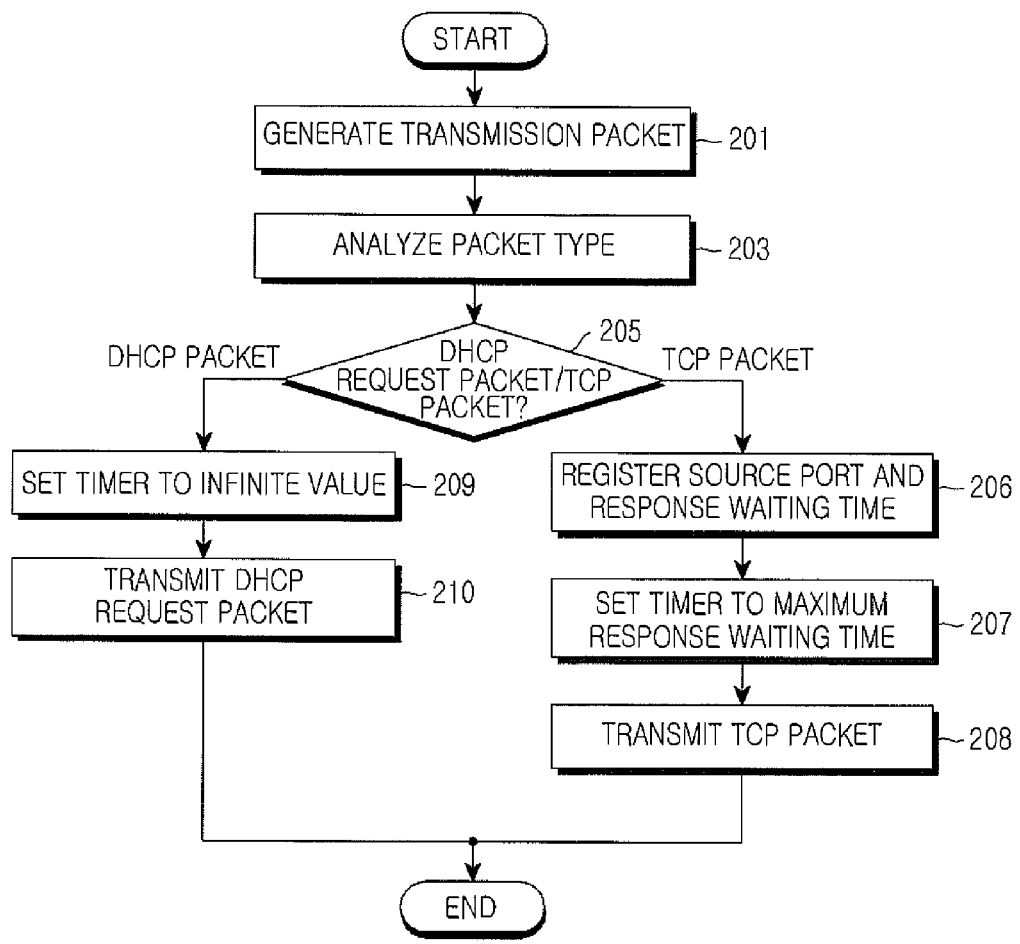
FIG. 2 illustrates a process for controlling a sleep mode upon generation of a transmission packet at an MS according to an embodiment of the present invention.
Figure 3:
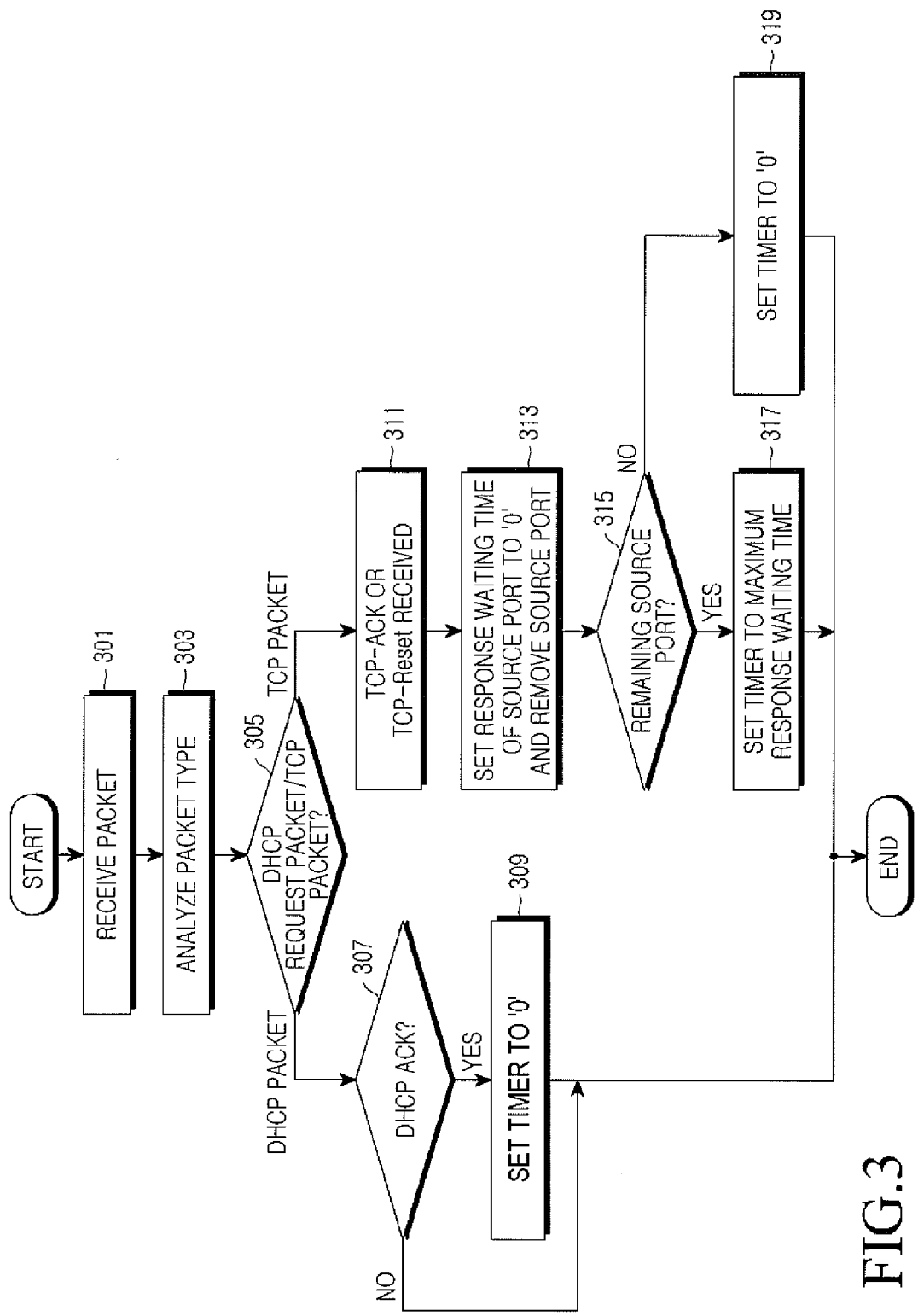
FIG. 3 illustrates a process for controlling a sleep mode upon receipt of a packet at an MS according to an embodiment of the present invention.
Figure 4:
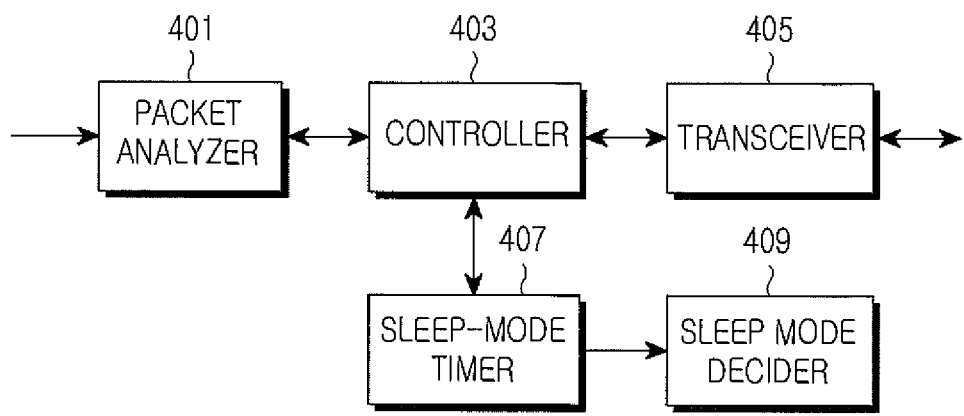
FIG. 4 illustrates an apparatus for controlling a sleep mode at an MS according to an embodiment of the present invention.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The matters defined in the description such as a detailed construction and elements are provided to assist in a comprehensive understanding of embodiments of the invention. Also, descriptions of well-known functions and constructions are omitted for the sake of clarity and conciseness.

Before a detailed description of the present invention, the basic concept of the present invention will first be described.

The term used herein 'timer value' is used interchangeably with 'timer period' signifying a time period between the start of a timer and the expiration of the timer.

In accordance with the present invention, a different sleep-mode timer value is set based on the type of a transmission packet or received packet of a Mobile Station (MS). Specifically, in a Dynamic Host Configuration Protocol (DHCP) packet, the MS sets a timer to an infinite timer value. Upon receipt of a DHCP Acknowledgment (ACK) for a transmitted DHCP packet, the MS resets the timer to zero ('0') so as to enter a sleep mode. In a Transmission Control Protocol (TCP) packet, the MS sets a timer to a predetermined sleep-mode timer value. Upon expiration of the timer upon receipt of an ACK or Reset signal for a transmitted TCP packet, the MS sets the response waiting time of a corresponding port to zero ('0'). If the timer is reset to the maximum of the response waiting times of ports or, in the absence of a port that waits for a response, the timer is reset to zero ('0') such that the MS may enter the sleep mode. While embodiments of the present invention will be described in the context of a TCP packet and a DHCP packet as packet types, different timer values can be set for many other packets according to their characteristics depending on system settings.

Hereinafter, 'power-saving mode' is interchangeable with 'sleep mode' within the same context.

Now a detailed description will be given of embodiments of the present invention.

FIG. 2 illustrates a process for controlling a sleep mode upon generation of a transmission packet at an MS according to an embodiment of the present invention.

Referring to FIG. 2, upon generation of a transmission packet in block 201, the MS analyzes the type of the transmission packet in block 203.

In block 205, the MS determines whether the transmission packet is a DHCP Request packet or a TCP packet according to the analysis. If the transmission packet is a DHCP Request packet, the MS performs blocks 209 and 210. If the transmission packet is a TCP packet, the MS performs blocks 206, 207, and 208. The DHCP Request packet and a DHCP ACK packet are both DHCP packets.

Transmission of a DHCP Request packet will first be described below.

As described previously, a DHCP procedure involves transmission of a DHCP Request packet to a Base Station (BS) by an MS and reception of a response to the DHCP Request packet from the BS by the MS. Before transmitting the DHCP Request packet, the MS sets a timer to an infinite sleep-mode (or power-saving mode) timer value in block 209 and transmits the DHCP Request packet to the BS in block 210. The reason for setting an infinite timer value is that the DHCP procedure should precede Internet Protocol (IP) packet communication, and thus the MS should receive a DHCP ACK packet from the BS.

Thereafter, the MS may enter the sleep mode immediately according to the sleep-mode timer value or may take time before entering the sleep mode, taking into account other situations. Other situations refer to service characteristics or a hardware state. For example, if a current service is highly probable to generate a packet shortly after the sleep mode is entered, it may be inefficient for the MS to enter the sleep mode immediately. Thus the MS may determine whether to enter the sleep mode, taking into account this service characteristic.

Transmission of a TCP packet will now be described.

In block 206, the MS registers a source port that has generated the TCP packet and the response waiting time of the source port. In general, a plurality of ports are provided to generate TCP packets. Response waiting times for the individual ports are managed separately. Accordingly, if TCP packets are generated from a plurality of source ports, the MS registers the plurality of source ports and their response waiting times.

In block 207, the MS sets a timer to the maximum of the registered response waiting times. The MS then transmits the TCP packet to the BS in block 208.

For example, it is assumed that first, second, and third TCP packets are sequentially generated from first, second, and third ports, respectively, and the response waiting time for the ports is set at 64 seconds is. In this situation, the timer is set to a time longer than 64 seconds from a time when the third packet is generated from the third port. If the ports have different response waiting times in the example, the timer is set to the maximum of the response waiting times.

FIG. 3 illustrates a process for controlling a sleep mode upon receipt of a packet at an MS according to an embodiment of the present invention.

Referring to FIG. 3, upon receipt of a packet in block 301, the MS analyzes the type of the received packet in block 303. In block 305, the MS determines whether the received packet is a DHCP packet or a TCP packet according to the analysis.

If the received packet is a DHCP packet, the MS determines whether the received DHCP packet includes an ACK, i.e. whether the received DHCP packet is a DHCP ACK packet, in block 307. If the received DHCP packet is a DHCP ACK packet, the MS sets a sleep-mode timer to zero ('0') in block 309. Thereafter, the MS may enter the sleep mode immediately according to the sleep-mode timer value or may take time before entering the sleep mode, taking into account other situations. Other situations refer to service characteristics or a hardware state. For example, if a current service is highly probable to generate a packet shortly after the sleep mode is entered, it may be inefficient for the MS to enter the sleep mode immediately simply because the timer value is zero ('0'). Thus the MS may determine whether to enter the sleep mode, taking into account this service characteristic.

If the received packet is a TCP packet, the MS determines whether the received TCP packet includes an ACK or a Reset, i.e. the received TCP packet is a TCP-ACK packet or a TCP-Reset packet, in block 311. The MS sets the response waiting time of a source port from which the TCP packet has been to zero ('0') and removes the source port in block 313. The TCP-Reset packet is transmitted for the BS to notify that the TCP packet has been processed. Because the MS can determine from the TCP-Reset packet that the transmitted TCP packet has been processed normally, it handles the TCP-Reset packet like the TCP-ACK packet. The TCP-ACK packet and the TCP-Reset packet are both TCP packets.

The MS determines whether any source ports remain to wait for a response in block 315. In the presence of any remaining source ports waiting for a response, the MS resets the timer to the maximum of the response waiting times of the remaining source ports in block 317. In the absence of any remaining source port waiting for a response, the MS resets the timer to zero ('0') such that it may enter the sleep mode in block 319.

Blocks 311 to 319 will be described, taking the source ports described with reference to FIG. 2. If the first, second, and third ports all have the same response waiting time (e.g. 64 seconds), the timer is set to the response waiting time of the third port when the third packet generated from the third port is transmitted. If an ACK is received first for the third packet, the MS sets the response waiting time of the third port to zero ('0') and removes the third port. Because the first and second ports are waiting for responses, the timer will be reset to the longer between the response waiting times of the two ports. In this situation, the response waiting times of the first and second ports are equal and the second packet was generated from the second port later than the first packet from the first port. Therefore, the timer is reset to the response waiting time of the first and second ports.

If the ports have different response waiting times, the MS sets the response waiting time of a port corresponding to a received ACK to zero ('0'), removes the port, and resets the time to the longer between the response waiting times of the remaining ports.

As described above, the present invention efficiently controls the sleep mode by setting different timer values for a DHCP packet and a TCP packet.

FIG. 4 illustrates an apparatus for controlling a sleep mode at an MS according to an embodiment of the present invention.

Referring to FIG. 4, a packet analyzer 401 receives a packet from a higher layer (e.g. Layer 3), analyzes the received packet, and notifies a controller 403 of the type of the received packet. The controller 403 controls the timer value of a sleep-mode timer 407 according to the type of the packet, transmits the packet to a BS through a transceiver 405, and receives a response message for the transmitted packet through the transceiver 405.

If the transmission packet is a DHCP Request packet, the controller 403 sets the sleep-mode timer 407 to an infinite value. Upon receipt of a DHCP packet in response to the transmitted DHCP Request packet from the BS, the controller 403 determines whether the DHCP packet includes a DHCP ACK by analyzing the DHCP packet. If the DHCP packet includes a DHCP ACK, the controller 403 resets the sleep-mode timer 407 to zero ('0').

If the transmission packet is a TCP packet, the controller 403 registers a source port from which the TCP packet has been generated and the response waiting time of the source port and sets the sleep-mode timer 407 to the response waiting time. If a plurality of TCP packets are generated from a plurality of source ports, the controller 403 registers the source ports and their response waiting times and sets the sleep-mode timer 407 to the maximum of the response waiting times.

Upon expiration of the sleep-mode timer 407 or upon receipt of an ACK or Reset for the transmitted TCP packet from the BS through the transceiver 405, the controller 403 sets the response waiting time of a corresponding source port to zero ('0') and removes the source port. If there remain source ports waiting for responses, the controller 403 resets the sleep-mode timer 407 to the maximum of the response waiting times of the remaining source ports. In the absence of any remaining source port waiting for a response, the controller 403 resets the sleep-mode timer 407 to zero ('0').

The sleep-mode timer 407 is set to a timer value under the control of the controller 403. As described above, if the sleep-mode timer 407 is set to zero ('0'), the sleep-mode timer 407 transmits the timer value '0' to a sleep mode decider 409.

The sleep mode decider 409 may enter the sleep mode according to the timer value received from the sleep-mode timer 407. The sleep mode decider 409 may determine to enter the sleep mode, taking into account the timer value '0', a hardware state, or the characteristics of a current service.

As is apparent from the above description of the embodiments of the present invention, because a sleep-mode timer is set to a value according to the type of a packet, an MS does not lose the packet which might otherwise be lost due to expiration of the sleep-mode timer before packet transmission or reception. Even when the MS uses a packet service that generates packets in a short period, the MS can enter a sleep mode based on setting of a timer value, thereby conserving power.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a sleep mode in a Mobile Station (MS) in a packet-based communication system, the method comprising:
    analyzing a type of a first packet for transmission or reception; and,
    setting a sleep-mode timer to a variable timer value based on the analyzed type of the first packet, when the analyzed type of the first packet is one of a Dynamic Host Configuration Protocol (DHCP) Request packet and a Transmission Control Protocol (TCP) packet; and
    resetting the sleep-mode timer to a predetermined timer value that configures the MS to enter the sleep mode, upon receipt of one of an Acknowledgment (ACK) packet and a Reset packet, in response to the first packet from a Base Station (BS).

2. The method of claim 1, wherein if the analyzed type of the first packet is the DHCP Request packet, the variable timer value is a specific value that configures the sleep-mode timer not to expire before the receipt of the ACK packet in response to the DHCP Request packet.

3. The method of claim 1, wherein if the analyzed type of the first packet is the DHCP Request packet, the variable timer value is an infinite value.

4. The method of claim 1, wherein if the analyzed type of the first packet is the TCP packet, the variable timer value is a maximum response waiting time set for a port that has generated the TCP packet.

5. The method of claims 4, wherein if the analyzed type of the first packet is the TCP packet, further comprising:
    removing the port that has generated the TCP packet, upon receipt of one of the ACK packet and the Reset packet, in response to the TCP packet.

6. The method of claim 5, further comprising:
    if there are other remaining ports waiting for responses, resetting the timer to the maximum response waiting time of the other remaining ports.

7. The method of claim 1, wherein the predetermined value that configures the MS to enter the sleep mode is '0'.

8. An apparatus of a Mobile Station (MS) for controlling a sleep mode in a packet-based communication system, the apparatus comprising:
    a packet analyzer configured to analyze a type of a first packet for transmission or reception;
    a controller configured to set a sleep-mode timer to a variable timer value based on the analyzed type of the first packet, when the analyzed type of the first packet is one of a Dynamic Host Configuration Protocol (DHCP) Request packet and a Transmission Control Protocol (TCP) packet; and to reset the sleep-mode timer to a predetermined timer value that configures the MS to enter the sleep mode, upon receipt of one of an Acknowledgment (ACK) packet and a Reset packet, in response to the first packet from a Base Station (BS),
    the sleep-mode timer configured to operate according to the setting and resetting of the controller.

9. The apparatus of claim 8, wherein if the analyzed type of the first packet is the DHCP Request packet, the variable timer value is a specific value that configures the sleep-mode timer not to expire before the receipt of the ACK packet in response to the DHCP Request packet.

10. The apparatus of claim 8, wherein if the analyzed type of the first packet is the DHCP Request packet, the variable timer value is an infinite value.

11. The apparatus of claim 8, wherein if the analyzed type of the first packet is the TCP packet, the variable timer value is a maximum response waiting time set for a port that has generated the TCP packet.

12. The apparatus of claim 11, wherein if the analyzed type of the first packet is the TCP packet, the controller is further configured to remove the port that has generated the TCP packet, upon receipt of one of the ACK packet and the Reset packet, in response to the TCP packet.

13. The apparatus of claim 12, wherein if there are other remaining ports waiting for responses, the controller is further configured to reset the timer to the maximum response waiting time of the other remaining ports.

14. The apparatus of claim 8, wherein the predetermined value that configures the MS to enter the sleep mode is '0'.

15. A method for controlling a sleep mode in a Mobile Station (MS) in a packet-based communication system, the method comprising:
    analyzing at least one of a transmission packet and a received packet to determine a packet type; and
    setting a sleep-mode timer to a variable timer value based on the analyzing, when the at least one of the transmission packet and the received packet is one of a Dynamic Host Configuration Protocol (DHCP) Request packet and a Transmission Control Protocol (TCP) packet; and
    resetting the sleep-mode timer to a predetermined timer value that configures the MS to enter the sleep mode, upon receipt of one of an Acknowledgment (ACK) packet and Reset packet, in response to the transmission packet from a Base Station (BS).

16. The method of claim 15, wherein if the analyzed type of the transmission packet is the DHCP Request packet, the variable timer value is a specific value that configures the sleep-mode timer not to expire before the receipt of the ACK packet in response to the DHCP Request packet.

17. The method of claim 15, wherein if the analyzed type of the transmission packet is the DHCP Request packet, the variable timer value is an infinite value.

18. The method of claim 15, wherein if the analyzed type of the transmission packet is the TCP packet, the variable timer value is a maximum response waiting time set for a port that has generated the TCP packet.

19. The method of claim 18, wherein if the analyzed type of the transmission packet is the TCP packet, further comprising:
   removing the port that has generated the TCP packet, upon receipt of one of the ACK packet and the Reset packet, in response to the TCP packet.

20. The method of claim 15, wherein the predetermined value that configures the MS to enter the sleep mode is '0'.

* * * * *